Feb. 14, 1961  G. C. JOHNSON ET AL  2,971,824
PROCESS FOR RECOVERING SULFUR FROM HYDROGEN
SULFIDE-CONTAINING GASES
Filed Aug. 11, 1958
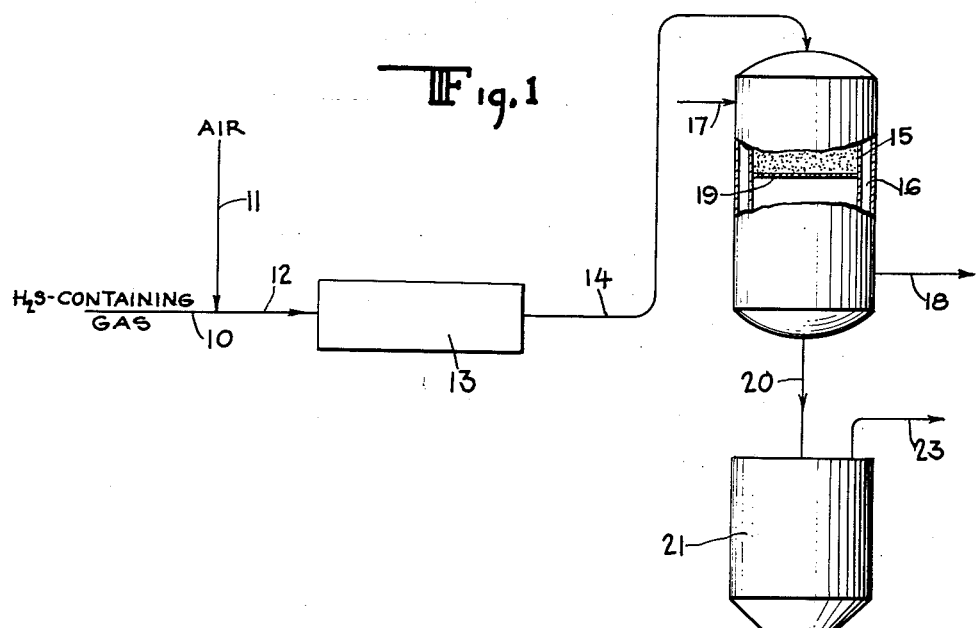
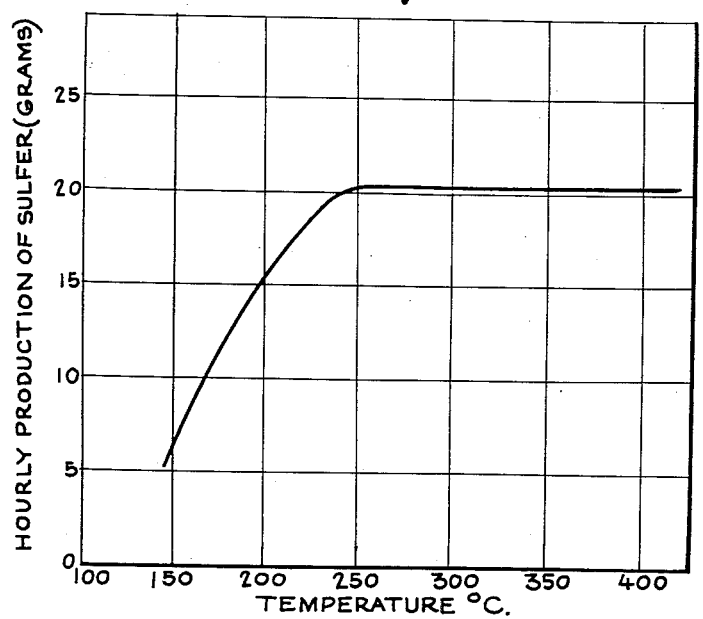
INVENTORS
George G. Johnson
BY George T. Kerr
Raymond W. Barclay
ATTORNEY

United States Patent Office 2,971,824
Patented Feb. 14, 1961

2,971,824

PROCESS FOR RECOVERING SULFUR FROM HYDROGEN SULFIDE-CONTAINING GASES

George C. Johnson, Woodbury, and George T. Kerr, Delaware Township, Camden County, N.J., assignors to Socony Mobil Oil Company, Inc., a corporation of New York Filed Aug. 11, 1958, Ser. No. 754,355

18 Claims. (Cl. 23—225)

This invention relates to a catalytic process for recovering sulfur from hydrogen sulfide-containing gases. More particularly, the present invention is directed to a process for the manufacture of free or elemental sulfur from gaseous streams rich in hydrogen sulfide by direct oxidation of the hydrogen sulfide with air or other gases containing free oxygen in the presence of a new catalyst.

Industrial gases containing hydrogen sulfide have, in the past, often been regarded as troublesome and various means have been devised for disposal thereof. Thus, gases of this type have been disposed of by burning under boilers with conversion of the hydrogen sulfide to sulfur dioxide and water. While the products of combustion so obtained are less obnoxious than the original gas, the release of sulfur dioxide into the atmosphere is detrimental to vegetation, is corrosive of metal surfaces with which it comes into contact and is considered a health menace. In the manufacture of illuminating and fuel gas by destructive distillation of coal, hydrogen sulfide is present in the crude gas and ordinarily must be removed therefrom before such gas can be marketed. Hydrogen sulfide is also a constituent of natural gas and is produced in petroleum refineries when operating on sour crude stocks. The presence of hydrogen sulfide in gaseous streams containing hydrocarbons may render such streams unsuitable for further industrial processing to other valuable products since the hydrogen sulfide often causes processing difficulties and increased costs. Such problem has led to the development of methods for the removal of hydrogen sulfide from admixture with hydrocarbons. The principal methods employed have been absorption processes wherein liquid solutions such as alkanolamines or alkaline phosphates are employed as absorbents for the acidic components such as hydrogen sulfide and thereafter regenerated for further use by release of the acidic gases therefrom. In more recent years, with an increasing demand for free sulfur, considerable attention has been given to the development of inexpensive and effective methods for the recovery of elemental sulfur from hydrogen sulfide-containing gases such as sour petroleum and natural gases as well as other gases derived from various manufacturing operations.

It has been known for some time that hydrogen sulfide or gases containing the same could be burned in the presence of oxygen to produce a certain amount of elemental sulfur. Under conditions normally employed and disclosed by the prior art, yields up to about 70% of the stoichiometrical have been obtained by direct combustion of hydrogen sulfide and air. The reaction is highly exothermic and it has been the practice, in carrying out the reaction, to reduce the temperature and to make use of the heat liberated. Because of the comparatively low yields, namely up to 70% of the stoichiometrical, the single step combustion of hydrogen sulfide to sulfur has not been practiced on a commercial scale, due to the waste of hydrogen sulfide remaining unconverted and to the problem involved in disposal of such gases. With procedures involving direct oxidation of hydrogen sulfide to sulfur, it has also been proposed to overcome heat transfer problems arising from the highly exothermic reaction involved by effecting the reaction in a fluidized catalyst bed of bauxite or equivalent material. While such technique may maintain reaction temperatures within the desired range, the catalyst itself is entrained in relatively large amounts with the product sulfur so obtained. Further, operations employing such a process would necessarily require large reactors and consequently a relatively high initial investment.

Efforts have accordingly been directed, in the past, almost exclusively to the development of a process for effecting limited or partial oxidation of hydrogen sulfide to eliminate excessive temperature build-up in the reaction zone and to thereby avoid oxidation of appreciable quantities of the product sulfur to sulfur dioxide. In the early proposed processes, partial oxidation was obtained by limiting the capacity of a given furnace. Other proposals have involved recycling of the flue gases to the combustion zone. More recent modifications provide for combustion of approximately one-third of the hydrogen sulfide to sulfur dioxide with air followed by subsequent reaction of the remaining two-thirds of the hydrogen sulfide with the sulfur dioxide to produce elemental sulfur. Processes commercially employed at the present time involve such modifications and are based on the following reactions:

(1) 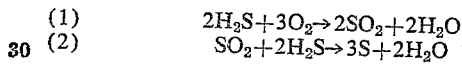  $2H_2S + 3O_2 \rightarrow 2SO_2 + 2H_2O$
(2) $\phantom{XXXXXXX}SO_2 + 2H_2S \rightarrow 3S + 2H_2O$ In carrying out a process utilizing the above combination of reactions, one third of the total feed stream is directed to a furnace in which it is mixed with air under conditions such that sulfur dioxide and water are the principal products in accordance with Equation 1. The furnace combustion products are then combined with the remaining two-thirds of the feed stream and conducted into a separate converter of considerable size where reaction takes place in accordance with Equation 2. Since the reaction shown by this latter equation is relatively slow compared to the reaction involving the direct combustion of hydrogen sulfide to free sulfur, the converters employed necessarily must be much larger than those required in the direct oxidation of hydrogen sulfide to obtain an equivalent quantity of product sulfur. In addition, two such converters are ordinarily required, the second being employed to convert unreacted hydrogen sulfide in the tail gas from the first reactor. Due to the inherent complexity of such a system, the initial investment cost for a commercial plant employing such two-stage process is relatively high.

It is apparent from the above description of the commercial method generally employed at the present time, that a process in which hydrogen sulfide could be substantially completely oxidized directly to sulfur in accordance with the following equation:

(3) 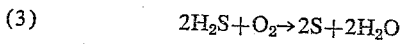  $2H_2S + O_2 \rightarrow 2S + 2H_2O$ would be highly attractive from an investment and operational standpoint. Attempts have been made in the past to obtain an operable process of this desired type, but none have been satisfactory in a commercial basis and the industry accordingly has continued to employ the relatively complex two-stage process referred to hereinabove.

It is an object of this invention to provide an effective catalytic process for the manufacture or recovery of elemental sulfur from hydrogen sulfide-containing gases by direct oxidation of hydrogen sulfide with air or other gases containing free oxygen. Another object of this invention is the provision of a process for effecting direct oxidation of hydrogen sulfide to sulfur without encountering the disadvantages attendant the procedures heretofore proposed. A further object of the invention is a catalytic process for the selective oxidation of hydrogen sulfide from its mixtures with methane and other paraffinic hydrocarbons. A still further object is the provision of an efficient commercially attractive process for the conversion of hydrogen sulfide to free sulfur of high quality in the presence of a selective catalyst.

The above and other objects which will be apparent to those skilled in the art are achieved in accordance with the process of this invention wherein a gaseous stream comprising hydrogen sulfide is contacted with a gas containing free oxygen in the presence of a synthetic crystalline aluminosilicate having a zeolitic structure of rigid three-dimensional network, uniform pore size and well defined intra-crystalline dimensions such that only reactant or product molecules of suitable size and shape may be transported in either direction between the exterior phase and the interior of the crystalline zeolite. Aluminosilicates of such structure have, in accordance with the present invention, been found to effectively catalyze the direct oxidation of hydrogen sulfide to free sulfur under conditions hereinafter set forth. Thus, hydrogen sulfide is catalytically oxidized at a temperature preferably in the approximate range of 200 to 400° C. to sulfur in a single reactor without combustion to intermediate sulfur dioxide. Catalytic operation within this preferred temperature range permits preferential oxidation of hydrogen sulfide to sulfur in the presence of a paraffinic hydrocarbon without encountering oxidation or degradation of the hydrocarbon.

The improvements realized in accordance with the present invention are believed to be directly attributable to effecting the oxidation of hydrogen sulfide in the presence of the hereinabove described crystalline aluminosilicate of particular lattice structure which has been discovered to be a specific and highly effective catalyst for the reaction involved. Crystalline zeolites, such as those utilized in the present process, wherein only molecules of particular size and shape are able to enter have been referred to as molecular sieves. These zeolites have heretofore been utilized for effecting separation of mixtures of materials of varying molecular size and have been described by Barrer in several publications and in U.S. 2,306,610 and U.S. 2,413,134. Thus, molecular sieves are essentially the dehydrated forms of crystalline natural or synthetic aluminosilicates of the zeolite family. All or a portion of the sodium or calcium ions normally contained in the molecular sieve structure may undergo exchange with a number of various other ions. The ions of sodium, calcium or metals in replacement thereof, silicon, aluminum and oxygen in these zeolites are arranged, in the form of an aluminosilicate in a definite and consistent crystalline pattern. This structure contains a large number of small cavities, interconnected by a number of still smaller holes. These cavities and holes are precisely uniform in size. Chemically, these zeolites may be represented by the general empirical formula:

$$M_{\frac{1}{n}}[(AlO_2)(SiO_2)_y] \cdot zH_2O$$

where M represents the metal cation $\frac{1}{n}$ is the number of exchangeable cations of valence $n$, $y$ is the number of silicon atoms and $z$ is the number of water molecules, removal of which produces the characteristic open network system. In the above formula, $y$ is a number between about 1 and about 1.5, and $z$ is a number from 0 to about 4. At the present time, there are commercially available molecular sieves of the "A" series and of the "X" series. A synthetic zeolite known as "molecular sieve 4A" is a crystalline sodium aluminosilicate having channels about 4 Angstroms in diameter.

In the hydrated form, this material is chemically characterized by the unit cell formula:

$$Na_{12}(AlO_2)_{12}(SiO_2)_{12} \cdot 27H_2O$$

The synthetic zeolite known as "Molecular Sieve 5A" is a crystalline aluminosilicate having channels about 5 Angstroms in diameter and in which 4 or more of the 12 ions of sodium in the immediately above formula are replaced by calcium, it being understood that calcium replaces sodium in the ratio of one calcium ion for two sodium ions. A crystalline sodium aluminosilicate which has ports of approximately 13 Angstrom units in diameter is also available commercially under the name of "molecular sieve 13X." The letter "X" is used to distinguish the inter-atomic structure of this zeolite from that of the "A" crystal mentioned above. As prepared, the 13X material contains water and has the unit cell formula:

$$Na_{86}[AlO_2)_{86}(SiO_2)_{106}] \cdot 267H_2O$$

The parent zeolite is dehydrated to make the active catalyst. The 13X crystal is structurally identical with faujasite, a naturally-occurring zeolite. Faujasite, however, is not identical in composition with the 13X zeolite. The synthetic zeolite known as "molecular sieve 10X" is a crystalline aluminosilicate having channels about 10 Angstrom units in diameter and in which substantially all of the sodium ions of the 13X material have been replaced by calcium.

Molecular sieves of the "A" series consist fundamentally of a three-dimensional structure of $SiO_4$ and $AlO_4$ tetrahedra. The silicon and aluminum ions share oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, Mg, $Na_2$, $K_2$ or $Li_2$ is equal to unity. One cation may be exchanged either in entirety or partially by another cation utilizing ion exchange techniques as discussed hereinbelow.

Molecular sieves of the "A" series are ordinarily prepared initially in the sodium form of the crystal. The sodium ions in such form may, as desired, be exchanged for other cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes from this hot mixture is separated therefrom and water washed to remove excess alkali. After heating until dehydration is attained, the substance is ready for use.

The general formula for the zeolites utilized herein can be expressed as a multiple of:

$$M_{\frac{1}{n}} \cdot AlO_2 \cdot ySiO_2, zH_2O$$

where M is a metal and $n$ its valence. A specific crystalline zeolite has values of $y$ and $z$ within a definite range. The value of $y$ for any specific zeolite varies in a certain manner depending on whether aluminum or silicon atoms occupy equivalent positions in the lattice. For molecular sieves of the "A" series, $y$ has an average value of 1. The value of $z$ may vary from 2.25 to 0. The average value of $z$ for the completely hydrated sodium zeolite of the "A" series is 2.25. In the above general formula, the ratio Na to Al is equal to 1. However, if during the process of preparation, excess of the base present in the mother liquor is not eliminated by washing of the crystalline precipitate, analysis will show a ratio slightly greater than 1. On the other hand, if the washing is excessive a certain amount of exchange of the sodium with hydrogen ions may take place bringing the aforementioned ratio to slightly less than 1.

Suitable reagents in the preparation of the sodium zeolite of the "A" series include silica sol, silica gel, silicic acid, or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperatures (21° C. and 150° C.) an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

As indicated hereinabove, the sodium ions of the above zeolite may be replaced partially or completely by other cations. These replacing ions include other monovalent or divalent cations such as lithium and magnesium, metal ions of the first group of the periodic table such as potassium and silver, metal ions of the second group such as calcium, zinc and strontium, metal ions of the transition metals such as nickel, cobalt and other ions such as ammonium which, with the sodium zeolite of the "A" series, react as metals in that they replace the sodium ions without occasioning any appreciable change in the fundamental structure of the crystalline zeolite. Replacement is suitably accomplished by contacting the crystalline sodium aluminosilicate zeolite with a solution of an ionizable compound of the ion which is to be exchanged into the molecular sieve structure for a sufficient time to bring about the extent of desired introduction of such ion. Repeated use of fresh solutions of the entering ion is of value to secure more complete exchange. After such treatment, the resulting exchanged product is water-washed, dried and dehydrated.

Sodium zeolite of the "A" series exchanged with calcium or magnesium admits larger molecules than the unexchanged material. An unusual characteristic of the calcium or magnesium exchanged zeolites is that the opening of the pores is not accomplished progressively as the sodium ions are replaced by calcium ions but is produced within a fairly narrow range of composition. When the exchange is 25% or less, the substance possesses substantially the same pore characteristics as the sodium zeolite of the "A" series, namely a pore diameter of about 4 Angstrom units. However, when the exchange exceeds 40%, the pore characteristics become those of the calcium and magnesium zeolites of the "A" series, i.e. a pore diameter of about 5 Angstrom units. This remarkable effect is evident, for example, by the amount of heptane adsorbed on the sodium zeolite of the "A" series with increasing replacement of the sodium ions therein with calcium as shown below:

| Percent of Sodium Ions Replaced in Molecular Sieve 4A By Calcium Ions | Wt. Percent Heptane Adsorbed at 25° C. under 45 mm. of Mercury |
| --- | --- |
| 0 | |
| 10 | 0.1 |
| 25 | 0.1 |
| 40 | 1.3 |
| 70 | 13.8 |
| 100 | 15.5 |
| | 16.5 |

As noted hereinabove, there are numerous forms of zeolites of the "A" series having exchanged ions. Generally, the substances having a divalent exchanged ion such as zinc, nickel and strontium zeolites, have pore size characteristics analogous to those of calcium and magnesium of the "A" series. The substances having a monovalent ion such as lithium zeolite of the "A" series, on the other hand, have pore size characteristics similar to the sodium zeolite of such series.

Molecular sieves of the "X" series are characterized by the formula:

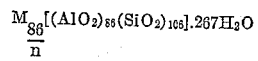

where M is $Na^+$ or $Ca^{++}$ or other ions introduced by replacement thereof and n represents the valence of the cation M. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the general formula:

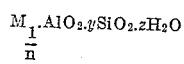

y has an average value of 1.2 to 1.3. The value of z may vary from 3.1 to 0. The average value of z for the completely hydrated sodium zeolite of the "X" series is 3.1.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ of 3 to 5, $Na_2O/SiO_2$ of 1.2 to 1.5 and $H_2O/Na_2O$ of 35 to 60.

In accordance with the present invention it has been discovered that aluminosilicates of the type discussed above having pores or channels of about 5 Angstrom units or larger, generally in the range of 5 to 13 Angstrom units, effectively catalyze the direct oxidation of hydrogen sulfide to sulfur upon admixture of a hydrogen sulfide-containing gaseous stream, a gas containing free oxygen and catalyst of aluminosilicate in a reaction zone under temperature conditions at least sufficient to cause reaction of said hydrogen sulfide and said gas containing free oxygen to form free sulfur.

The crystalline aluminosilicate having the above-defined pore characteristics is advantageous for use in catalyzing the direct oxidation of hydrogen sulfide to elemental sulfur since such material has been found to possess desirable characteristics lacking in other materials heretofore proposed for use as catalysts in the specified reaction. Thus, the crystalline aluminosilicate catalyst employed in the process of the invention is characterized by a high activity, a long life, a high selectivity and possesses in preferred embodiments the unusual property of being self-starting, i.e. of having the ability to initiate the desired oxidation reaction by introducing the reactants of oxygen-containing gas and hydrogen sulfide-containing gas into the reaction zone at substantially room temperature and permitting the temperature to rise by reason of the exothermic reaction taking place until the desired temperature of reaction is attained. Such ability as will be realized is advantageous in elimination of the steps of preheating the reactant streams and heating the reactor to the desired temperature of reaction and thereby affords an overall less expensive and more efficient method of operation.

The high activity of the crystalline aluminosilicate in catalyzing the oxidation of hydrogen sulfide to sulfur is shown not only by the self starting characteristics but also, as will be evident from hereinafter presented comparative data, by the increase in rate of production of sulfur in comparison with previously proposed substances such as bauxite, activated alumina, silica gel, and similar contact materials. The long life of the crystalline aluminosilicate in catalyzing the oxidation of hydrogen sulfide is shown by the fact that such material was employed in the reaction zone for a period of several days with undiminished activity. The comparable oxidation reaction carried out under identical conditions but utilizing as catalyst an activated alumina (F–10 alumina) ceased to function after two hours. The long life of the catalyst employed in the method of the invention permits operation of the process in a continuous manner. The efficiency or selectivity of the process described herein is shown by the substantially complete conversion of oxygen present in the reaction mixture to water, the absence of hydrogen sulfide and sulfur dioxide in the spent gas and the finding that the oxidation of hydrogen sulfide to sulfur may be conducted in the presence of a paraffinic hydrocarbon such as methane.

The catalyst of aluminosilicate employed in the present process is preferably used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the crystalline aluminosilicate with a suitable binder such as clay. The commercially available material of the "A" and "X" series described hereinabove may be obtained on a clay-free basis or in the form of pellets in which clay is present as a binder.

It is necessary that the crystalline aluminosilicate employed herein as catalyst have a pore diameter of at least about 5 Angstrom units. Thus, a crystalline sodium aluminosilicate having a pore diameter of 4 Angstrom units (molecular sieve 4A) failed under the conditions of the present process to afford any sulfur production. On the other hand, an aluminosilicate having a pore diameter of 5 Angstrom units (molecular sieve 5A) proved to be an effective catalyst. Other conditions being the same, an enhanced rate of sulfur production is obtained with catalysts of aluminosilicates having pore diameters in the range of 10 to 13 Angstrom units, i.e. molecular sieves of the "X" series, and such materials are accordingly preferred for use as catalysts in the present process. Particular preference is accorded aluminosilicates having a pore diameter of about 13 Angstrom units since in addition to providing a high rate of production of sulfur, such materials have the desirable attribute discussed hereinabove of being self-starting. Aluminosilicates of the "X" series partially exchanged by calcium, lithium or cobalt were found to be highly effective catalysts and to afford essentially the same results in the herein described method for oxidation of hydrogen sulfide to sulfur.

The gas containing free oxygen utilized in the present process is preferably in the form of air. In those cases where dilution of gas streams with nitrogen would be undesirable, as for example with hydrogen sulfide-containing reformer recycle gas, oxygen may be used instead of air. Where dilution is not objectionable, the heat of reaction could be dissipated by diluting the feed stream, particularly with recycled spent gas. This spent gas consists mainly of nitrogen.

The charge stock to the process of the present invention is a hydrogen sulfide-containing gas. Thus, the charge may be substantially pure hydrogen sulfide or gaseous mixtures containing hydrogen sulfide. The hydrogen sulfide gas may be obtained from any suitable source and is preferably one which is rich in hydrogen sulfide. For example, the concentrated hydrogen sulfide containing gases produced by the various processes employed in the petroleum and natural gas industry to purify petroleum liquids and gases may be used. Thus, the charge stock may include hydrogen sulfide extracted from casinghead gas, natural gas or refinery gases. In the removal of hydrogen sulfide with regenerative liquid absorbents, such as aqueous solutions of diethanolamine, triethanolamine, trisodium phosphate, and similar alkaline solutions, hydrogen sulfide, carbon dioxide and other acidic constituents are extracted therefrom. These materials, absorbed by the regenerative liquid absorbent, are subsequently given off when such liquid absorbent is regenerated for re-use. The gaseous hydrogen sulfide-containing concentrate may suitably be treated in accordance with the present invention to recover sulfur therefrom of extremely high purity.

The feed charge may be natural gas. In purifying natural gas, it is desirable that the hydrogen sulfide component be removed with little or no deleterious effect upon the constituents of the gas which make it valuable as fuel, namely, hydrocarbons of the methane series. In one embodiment the present invention affords an inexpensive and efficient method of removing hydrogen sulfide from natural gas containing the same and recovering free sulfur without injuriously affecting the other valuable constituents of the gas. The use of pure oxygen as the oxidizing agent, rather than air, is of particular value here in order to avoid the introduction of nitrogen into the gas and hence lowering its heating value, as expressed in B.t.u./cu. ft. The compositions of natural gases containing hydrogen sulfide vary appreciably. Most of the available sour natural gas is of low hydrogen sulfide content which may range from 2 percent by volume down to about 0.5 percent by volume or less. However, natural gas obtained from certain wells may have an extremely high hydrogen sulfide content of about 60 percent by volume or higher. Sour natural gas of the above-mentioned types may suitably be employed as the gaseous feed for the present process. Sour natural gas of low hydrogen sulfide content has value chiefly in the hydrocarbons present and in employing such a gaseous feed stream the process of this invention is useful primarily in purifying the natural gas, the sulfur produced from the hydrogen sulfide being a saleable by-product. If the natural gas has a high content of hydrogen sulfide such that its value lies chiefly in the sulfur content, the process described herein is useful in providing an economical single-step method whereby substantial quantities of sulfur are produced.

Other suitable charge stocks which may effectively be treated by the present process include hydrogen sulfide-containing gases separated in the manufacture of fuel gas, coke oven gas and various petroleum products. Such gases normally contain sulfur in the form of hydrogen sulfide and in addition thereto, usually contain water vapor and various gaseous materials in the form of $CO_2$, $CO$ and $H_2$ and in many instances low molecular weight hydrocarbons of the paraffinic or olefinic type. Certain chemical treating plants may produce waste gases containing recoverable amounts of sulfur compounds, usually mixed or combined with impurities. For example, plants for the manufacture of $CS_2$ from sulfur and methane, may throw off waste gases containing sulfur vapor, hydrogen sulfide, methane and other hydrocarbons.

The petroleum refining industry produces enormous amounts of fuel gas containing various amounts of hydrogen sulfide, dependent upon the sulfur content of the crude oil processed. The hydrogen sulfide content of such fuel gases may vary between about 2 and about 10 percent by volume and in certain instances the hydrogen sulfide may comprise the predominant portion of the fuel gas. Much of the refinery fuel gas is produced as a by-product of the catalytic cracking of gas oil to high octane gasoline and the continuing expansion of catalytic cracking facilities produces ever increasing amounts of fuel gas. If the hydrogen sulfide is allowed to remain in the fuel gas equipment, corrosion problems are encountered in its use and atmospheric pollution is increased. It is accordingly apparent that large amounts of sulfur could be produced from the hydrogen sulfide content of such a gas and its quality as fuel could also be improved. Certain other refinery gases which contain hydrogen sulfide are also available as the gaseous feed stream to the process of this invention. Certain of these gas streams are the hydrogen recycle gas from the catalytic reforming of naphthas and the hydrogen recycle gas employed in the catalytic hydrodesulfurization of petroleum. These two hydrogen recycle gases gradually accumulate amounts of hydrogen sulfide which are produced during catalytic reforming or hydrodesulfurization processes by destruction of the sulfur compounds in the petroleum feed. The hydrogen sulfide which is then produced as a contaminant in the hydrogen recycle gas is recovered. Purification means must be employed to eliminate or lower substantially the hydrogen sulfide content in order to permit re-use of the hydrogen recycle gas.

In operation of the process of this invention, care must be taken to proportion properly the quantity of oxygen introduced into the reaction zone. An excess of oxygen will generally lead to the oxidation of the sulfur to sulfur dioxide and an insufficient supply to the incomplete oxidation of hydrogen sulfide. An appreciable amount of either of these gases in the exit gases indicates improper proportions of oxygen to the hydrogen sulfide in the gases being used or that the temperature is improperly regulated. The amount of oxygen-containing gas employed will vary with the extent of hydrogen sulfide conversion desired. For example, as little as about 20 percent or less of the stoichiometric amount of oxidizing gas for conversion of hydrogen sulfide to free sulfur may be employed. Amounts larger than the stoichiometric amount may be employed but as the excess approaches about 15 percent, an adverse effect on the direction of hydrogen sulfide oxidation occurs; that is, sulfur dioxide appears in the effluent gas in significant amounts. As noted hereinabove, it is a particular embodiment of the present invention that substantially complete conversion of the hydrogen sulfide present is achieved in a single step operation in the presence of the described catalyst. In achieving such preferred state of operation, generally between about 80 percent and about 110 percent of the stoichiometric amount of the oxidizing gas required for conversion of the hydrogen sulfide to free sulfur is employed.

The temperature of reacting the gaseous hydrogen sulfide feed stream and the gas containing free oxygen with the catalyst should be in excess of about 175° C. and preferably in the range of 200° C. to 400° C., although the reaction may be carried out at temperatures as high as about 700° C. The reaction proceeds rapidly at higher temperatures and extremely high reaction rates are obtained when passing relatively pure hydrogen sulfide and air through a bed of the above-described catalyst at temperatures of 500° C. or more. In the presence of hydrocarbons, temperatures below about 650° C. should be maintained. As noted above, the temperature in the reaction zone may be above the boiling point of sulfur. It is, however, a preferred embodiment of the invention to maintain the temperature in the range of about 200° C. to 400° C.

The temperature of the process must be controlled due to the exothermic nature of the reaction taking place. Thus, the oxidation of hydrogen sulfide to produce sulfur is a highly exothermic reaction, and it is readily apparent that if a gaseous feed stream consisting essentially of hydrogen sulfide either alone or in admixture with hydrocarbons is passed together with a gas containing free oxygen through the catalyst at a temperature in excess of 175° C., the heat produced by the reaction will rapidly increase the temperature of the catalyst. Heat exchange or cooling means must therefore ordinarily be utilized for the reactor which contains the catalyst. As noted hereinabove, temperature control may be effected by dilution of the gaseous feed stream with an inert gas, or a coolant may be supplied to the reactor jacket. The coolant may be such a material as 1-methylnaphthalene, di-n-butylphthalate or other coolant circulated to maintain the selected temperature.

Space velocities ranging between about 1000 and about 100,000 volumes gas/hour/volume of catalyst may be employed in the present process depending on the hydrogen sulfide content of the gaseous feed. When the gaseous feed is substantially pure hydrogen sulfide, space velocities of about 50,000 to about 100,000 are generally used. High velocity and resultant low contact time with the catalyst is desirable to prevent the occurrence of secondary reactions which will occur if a prolonged time of contact is maintained. The depth of the layer of catalyst in the reactor is sufficient to provide the desired contact time between the reactant gases and catalyst to convert the hydrogen sulfide present to elemental sulfur.

The invention is further described with reference to the processing method shown in the attached Figure 1. Numerous pumps, valves and other items have been omitted from this illustrated embodiment for purposes of clarity. These items may readily be added by those skilled in the art.

Referring more particularly to Fig. 1, a hydrogen sulfide-containing feed gas is introduced through conduit 10. Air passes through line 11 and into conduit 10 where it is mixed in appropriate proportion with the gaseous feed. The mixture of gases is passed through line 12 and heater 13. The gaseous mixture from heater 13 is passed through conduit 14 into the top of reactor 15. Such reactor is provided with a cooling jacket 16 and coolant is introduced thereto through inlet 17 and withdrawn through outlet 18. A horizontally disposed perforated grid 19 serves as a support for the catalyst particles. The catalyst is maintained on the supporting grid in the form of a layer which preferably extends over the cross section of the reacting vessel. The gaseous mixture entering the top of reactor 15 passes downwardly therein flowing over the supported catalyst. The gaseous product containing steam and sulfur vapor passes from the bottom of reactor 15 through line 20 to sulfur condenser 21. Liquid sulfur is withdrawn from condenser 21 at a temperature of about 150° C. and is conducted through line 22 to suitable storage. A multiplicity of reactors, with intermediate condensation of sulfur and intermediate addition of one of the reactants, can be used if desired to control heat evolution. Uncondensed gases are removed from the top of condenser 21 through outlet 23.

The following examples will serve to illustrate the process of this invention without limiting the same:

EXAMPLE I

A 250 ml. separatory funnel was packed with 50 ml. of 4 mm. glass beads. Ten grams of 1/16" white pellets of sodium aluminosilicate 13X zeolite were placed on top of the beads. Hydrogen sulfide and air were introduced through a T-tube at the top of the funnel at rates of 1100 and 2700 ml. per minute, respectively. These rates correspond to the stoichiometric quantities necessary for oxidation of hydrogen sulfide to free sulfur and water. Almost immediately the catalyst pellets become tan in color, then brown and after several minutes were deep blue. Sulfur condensed on the glass beads and dripped in molten form from the funnel stem.

EXAMPLE II

Ten grams of catalyst powder of the sodium aluminosilicate 13X zeolite was placed in the bottom of a glass trap. It was purged for several minutes with nitrogen. Hydrogen sulfide was then passed into the trap. Some heat was evolved during the sorption of the gas by the catalyst. A short nitrogen purge then flushed unadsorbed gaseous hydrogen sulfide from the reactor. Upon introduction of air, the trap became hot and sulfur was formed on the catalyst powder.

EXAMPLE III

A quantity of 3 mm. glass beads supported on a stainless steel screen was placed in an annular reactor 9 mm. in width, 31 mm. in diameter and 60 mm. in height enclosed in a cooling jacket. Four grams of $\frac{1}{16}''$ catalyst pellets of sodium aluminosilicate 13X zeolite were placed on top of the beads. Approximately 250 ml. of 1-methylnaphthalene was placed in the cooling jacket and heated to its boiling point, i.e. 240–243° C. Hydrogen sulfide and air were introduced through a T-tube at rates of 360 ml. and 830 ml. per minute respectively. Under these rate conditions about 90% of the stoichiometric quantity of air was used. The catalyst pellets changed color from tan to brown to blue as previously described. After several minutes liquid sulfur flowed from the reactor. Over a 51 hour period, 1060 grams of sulfur was produced. The rate of sulfur production, 20 to 21 grams per hour, did not diminish throughout the time of reaction. Mass spectrometer analyses of feed and spent gases indicated an 85% conversion of hydrogen sulfide and a 95% conversion of oxygen. No sulfur dioxide was detected in the spent gas.

EXAMPLE IV

A mixture of 54 volume percent methane and 46 volume percent hydrogen sulfide was used as feed to the annular reactor described in the preceding example. Air and hydrogen sulfide were introduced at the rates described in Example III. Analyses showed no loss of methane, while the hydrogen sulfide was selectively oxidized to free sulfur. Sulfur dioxide was not detected in the spent gases.

EXAMPLE V

A catalyst consisting of 1.3 grams of $\frac{1}{16}''$ pellets of sodium aluminosilicate 13X zeolite was supported on a porous sintered glass disc in a cylindrical reactor provided with a cooling jacket. The catalyst bed was one to two pellets in depth. Approximately 35 ml. of 1-methylnaphthalene was placed in the jacket. Starting at room temperature, hydrogen sulfide and air were introduced at rates of 360 and 830 ml. per minute respectively. The catalyst pellets underwent the color changes noted in preceding examples and after 10 to 15 minutes the methylnaphthalene was refluxing. Meanwhile, sulfur condensed beneath the disc on the cool part of the reactor. Over a 110 hour period, 2100 grams of sulfur was produced. No change in rate of sulfur production was noted during this period. The sintered disc remained free of liquid sulfur. The temperature in the reaction zone was 320 to 350° C. The reaction was halted several times by shutting off the gas flow. After the reactor had cooled, the oxidation was spontaneously restarted by introducing air and hydrogen sulfide.

The following examples will serve to illustrate the effect of temperature on the rate of sulfur production:

EXAMPLE VI

Four grams of $\frac{1}{16}''$ catalyst pellets of sodium aluminosilicate 13X zeolite were placed on the top of a quantity of glass beads contained in an annular reactor such as described in Example III. Approximately 250 ml. of bromobenzene was charged to the cooling jacket of the reactor and heated to its boiling point, 155° C. Hydrogen sulfide and air were introduced through a T-tube at rates of 360 ml. and 830 ml. per minute respectively. The catalyst bed underwent the color changes noted hereinabove, but only about one fourth to one half of the pellets attained the blue color characteristic of activity. The hourly production of sulfur amounted to only about 7 grams, equivalent to a yield of approximately 30%, indicating that the reaction temperature employed was below the preferred range.

EXAMPLE VII

Using the same flow rates and the same reactor described in Example V a reaction was conducted with di-n-butylphthalate, boiling at 340° C, as the coolant. Starting at room temperature, the reaction commenced and continued as normal at the boiling point of the coolant. The entire catalyst bed appeared to be active and attained the blue color characteristic of activity. Sulfur was produced at a rate of about 20 grams per hour, equivalent to a yield of approximately 85% which as will be noted from Example III was essentially the same rate as with 1-methylnaphthalene as coolant.

The effect of coolant temperature on the reaction will be evident from the following data and from Figure 2 of the drawing wherein such data are presented graphically.

*Table I*

| Example | Boiling Point of Coolant, °C. | Hourly Production of Sulfur (grams) |
|---|---|---|
| VI | 155 | 7 |
| III | 240 | 20 |
| VII | 340 | 20 |

It will be seen from the foregoing that under the conditions of reaction, the production rate of sulfur increased approximately three-fold with an increase in temperature within the range 155 to 240° C. and thereafter leveled off with increasing temperature. It is preferred, as discussed hereinabove, to employ a reaction temperature of between about 200° C. and about 400° C. for the process of the invention.

EXAMPLE VIII

Using the same apparatus and coolant as described in Example V, flow rates of hydrogen sulfide and air of 360 and 900 ml. per minute, respectively, were passed through 1.3 grams of sodium aluminosilicate 13X pellets in which 60% of the sodium ions were replaced with lithium ions. The reaction started at room temperature and continued normally bringing the coolant to reflux. Over a 1-hour period, 17 to 18 grams of sulfur was collected. The spent gas consisted of 96.8 mole percent nitrogen and 1.1 mole percent argon, the remainder of the gas consisting of small amounts of hydrogen sulfide and air.

EXAMPLE IX

Using the same apparatus, coolant and gas flow rates as described in Example VIII, reactor was loaded with 1.0 gram of sodium aluminosilicate 13X powder in which 60% of the sodium ions were replaced by cobaltous ions. The reaction commenced at room temperature and continued as previously described to yield 17 to 18 grams of sulfur per hour.

EXAMPLE X

In exactly the same manner as described in Example VII, the reactor was loaded with 1.0 gram of sodium aluminosilicate 13X powder in which 80% of the sodium ions were replaced by calcium ions. Reaction started readily at room temperature and proceeded normally to yield approximately 18 grams of sulfur per hour.

A series of runs utilizing other materials, as well as the aluminosilicates discussed hereinabove as catalysts were carried out. In each instance, 1.0 gram of the material used was supported on a porous sintered glass disc in a cylindrical reactor provided with a cooling jacket containing 1-methylnaphthalene. In runs 1–4, and 8–10, hydrogen sulfide and air were introduced at rates of 360 and 830 ml. per minute respectively. In runs 5, 6 and 7, hydrogen sulfide and air were introduced at rates of 360 and 900 ml. per minute respectively. Each of the runs were carried out under two different conditions. These conditions involve:

(a) Introduction of feed gas into the reactor at room temperature to determine spontaneity of reaction.

(b) Introduction of feed gas into reactor heated to 240° C.

The following table summarizes the results:

Table II

| Run | Catalyst | Self Starting | Starting at 240° C. | Grams of Sulfur Per Hour at 240° C. | Percent $O_2$ Conversion |
|---|---|---|---|---|---|
| 1 | Molecular Sieve 4A | No | No | 0 | |
| 2 | Molecular Sieve 5A | Yes [1] | Yes | 10 | 86.5 |
| 3 | Molecular Sieve 10X [2] | No | Yes | 15.2 | 99 |
| 4 | Molecular Sieve 13X | Yes | Yes | 18.5 | 99+ |
| 5 | Li-form of Molecular Sieve 13X.[3] | Yes | Yes | 17–18 | 99+ |
| 6 | Co-form of Molecular Sieve 13X.[4] | Yes | Yes | 17–18 | 94 |
| 7 | Ca-form of Molecular Sieve 13X.[5] | Yes | Yes | 18 | 98 |
| 8 | Activated Alumina (F–10). | No | Yes | [6] 7.5 | |
| 9 | Silica Gel | No | No | 0 | |
| 10 | Bauxite (containing about 10% $Fe_2O_3$). | No | Yes | 12.5 | 72 |

[1] While Molecular Sieve 5A effected reaction at room temperature, the reaction was sluggish.
[2] Approximately 94% of the Na ions of Molecular Sieve 13X replaced by Ca.
[3] Approximately 60% of the Na ions of Molecular Sieve 13X replaced by Li.
[4] Approximately 60% of the Na ions of Molecular Sieve 13X replaced by Co.
[5] Approximately 80% of the Na ions of Molecular Sieve 13X replaced by Ca.
[6] The reaction with F–10 alumina stopped after about two hours.

It will be seen from the above table that both a high rate of sulfur production and a high consumption of oxygen was achieved with the molecular sieve metal aluminosilicate catalysts as compared with other materials such as activated alumina, silica gel and bauxite. The use of activated alumina (F–10) gave a relatively poor yield of sulfur and the reaction utilizing this material stopped after about two hours. The metal aluminosilicate catalysts, under identical reaction conditions, on the other hand, afforded continuous undiminished activity over a period of 4 to 5 days. Silica gel failed to catalyze the desired reaction. Bauxite afforded only a fair yield of sulfur and had poor activity since more than ¼ of the oxygen present in the reaction mixture remained unconverted. The molecular sieve aluminosilicate catalysts having pore diameters of 5 to 13 Angstrom units and particularly 10 to 13 Angstrom units afforded both a substantial production of sulfur and a high conversion of oxygen. The aluminosilicates having pore diameters of about 13 Angstrom units were outstanding in providing the highest rate of sulfur production and the highest percentage of oxygen conversion observed. In addition, these aluminosilicates possessed the desirable attribute of being self starting.

We claim:

1. A process for the production of elemental sulfur by the direct oxidation of hydrogen sulfide which comprises effecting reaction of a gaseous stream containing hydrogen sulfide and gas containing free oxygen in the presence of a catalyst consisting essentially of a solid crystalline aluminosilicate zeolite characterized by a rigid three-dimensional network and a homogeneous pore structure made up of uniform interstitial dimensions of at least about 5 Angstrom units in cross section at a temperature of between about 175° C. and about 700° C. and recovering the sulfur product.

2. The process of claim 1 in which the gas containing free oxygen is air.

3. The process of claim 1 in which the temperature is between about 200° C. and about 400° C.

4. The process of claim 1 in which the said gaseous stream containing hydrogen sulfide contains at least one paraffinic hydrocarbon and wherein the hydrogen sulfide component of said stream is selectively oxidized.

5. The process of claim 1 in which the said gaseous stream containing hydrogen sulfide contains methane and wherein the hydrogen sulfide component of said stream is selectively oxidized.

6. The process of claim 1 wherein the solid crystalline aluminosilicate is characterized by uniform interstitial dimensions in the range of 5 to 13 Angstrom units in cross section.

7. The process of claim 1 wherein the solid crystalline aluminosilicate is characterized by uniform interstitial dimensions in the range of 10 to 13 Angstrom units in cross section.

8. The process of claim 1 in which the crystalline zeolite is an aluminosilicate having a cation selected from the group consisting of alkali metals, ammonium, silver, calcium, strontium, zinc, nickel, cobalt and magnesium.

9. The process of claim 1 in which the crystalline zeolite is characterized by the general empirical formula:

$$M_{\frac{1}{n}}[(AlO_2)(SiO_2)_y].zH_2O$$

where M is a metal,

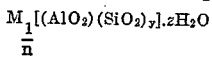

is the number of exchangeable cations of valence $n$, $y$ is a number between about 1 and about 1.5, and $z$ is a number between 0 and about 4.

10. The process of claim 1 in which the crystalline zeolite is a calcium aluminosilicate having uniform interstitial dimensions of about 5 Angstrom units in cross section.

11. The process of claim 1 in which the crystalline zeolite is a calcium aluminosilicate having uniform interstitial dimensions of about 10 Angstrom units in cross section.

12. The process of claim 1 in which the crystalline zeolite is a sodium aluminosilicate having uniform interstitial dimensions of about 13 Angstrom units in cross section.

13. The process of claim 1 in which the crystalline zeolite is a sodium aluminosilicate having uniform interstitial dimensions of about 13 Angstrom units in cross section and having a portion of the sodium ions thereof replaced by lithium ions.

14. The process of claim 1 in which the crystalline zeolite is a sodium aluminosilicate having uniform interstitial dimensions of about 13 Angstrom units in cross section and having a portion of the sodium ions thereof replaced by calcium ions.

15. The process of claim 1 in which the crystalline zeolite is a sodium aluminosilicate having uniform interstitial dimensions of about 13 Angstrom units in cross section and having a portion of the sodium ions thereof replaced by cobalt ions.

16. In a process for recovering elemental sulfur from a hydrogen sulfide-containing gas by means of direct oxidation of hydrogen sulfide, the steps which comprise mixing said gas with a second gas containing a sufficient quantity of free oxygen to react with the hydrogen sulfide present to produce elemental sulfur, contacting the resulting mixture of gases with a catalyst consisting essentially of a solid crystalline aluminosilicate zeolite characterized by a rigid three-dimensional network and a homogeneous pore structure made up of uniform interstitial dimensions of at least about 5 Angstrom units in cross section at a temperature between about 175° C. and about 700° C. and recovering the sulfur product.

17. The process of claim 16 wherein the hydrogen sulfide containing gas contains at least one paraffinic hydrocarbon and wherein the hydrogen sulfide component of said gas is selectively oxidized.

18. The process of claim 16 wherein the temperature is maintained in the approximate range of 200° C. to 400° C.

References Cited in the file of this patent

UNITED STATES PATENTS

| | | |
|---|---|---|
| 1,892,999 | Ralston et al. | Jan. 3, 1933 |
| 1,895,724 | Miller et al. | Jan. 31, 1933 |
| 2,083,895 | Connolly | June 15, 1937 |
| 2,306,610 | Barrer | Dec. 29, 1942 |
| 2,413,134 | Barrer | Dec. 24, 1946 |
| 2,836,481 | Hofstede | May 27, 1958 |
| 2,882,243 | Milton | Apr. 14, 1959 |
| 2,882,244 | Milton | Apr. 14, 1959 |
| 2,904,607 | Mattox et al. | Sept. 15, 1959 |